Jan. 19, 1965    R. L. SMIRL ETAL    3,165,891
SERVO-MOTOR FOR AUTOMATIC CLUTCH CONTROL
Original Filed Aug. 2, 1961    3 Sheets-Sheet 2
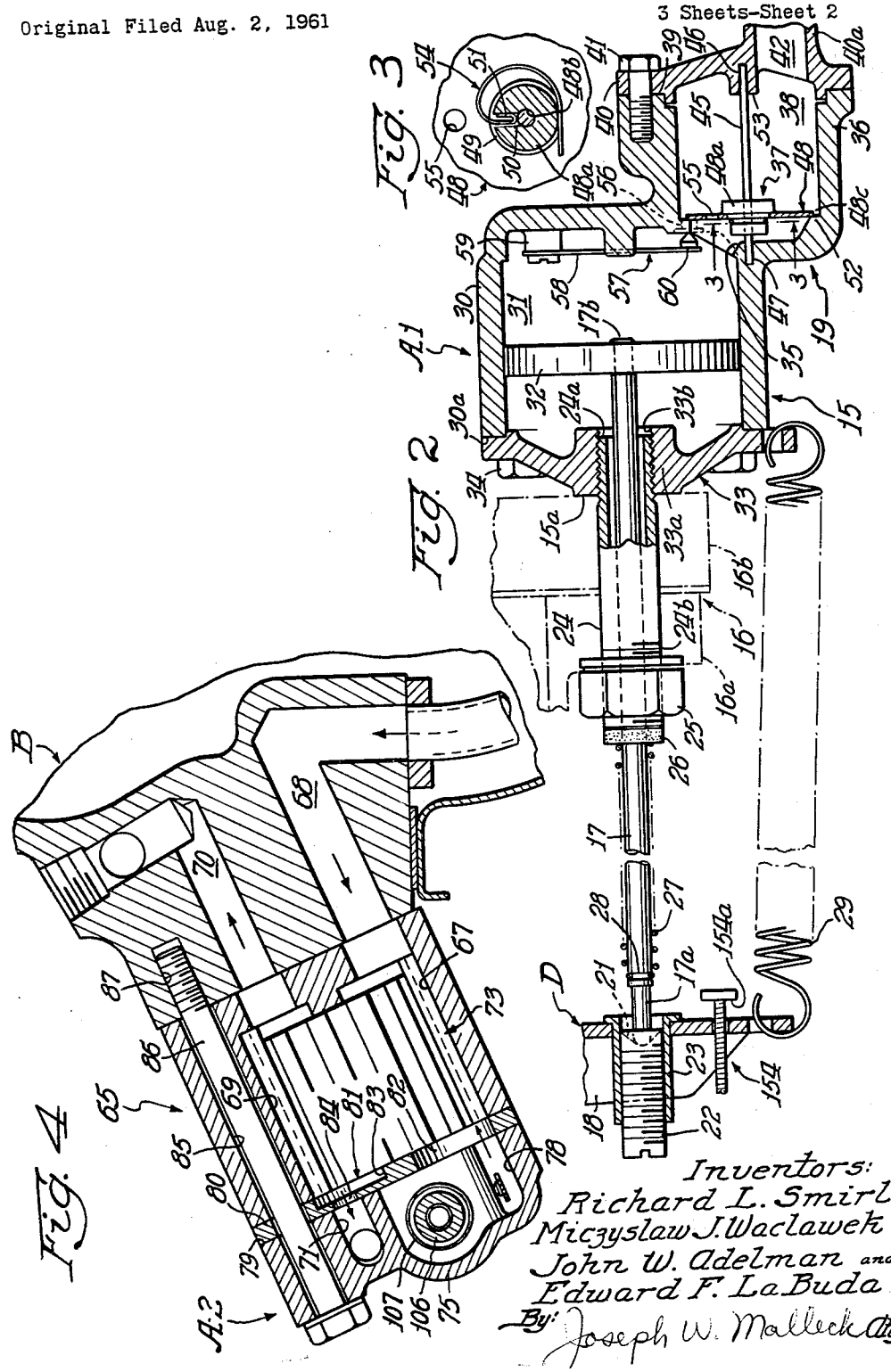
Inventors:
Richard L. Smirl
Miczyslaw J. Waclawek
John W. Adelman and
Edward F. LaBuda
By: Joseph W. Malleck Atty.

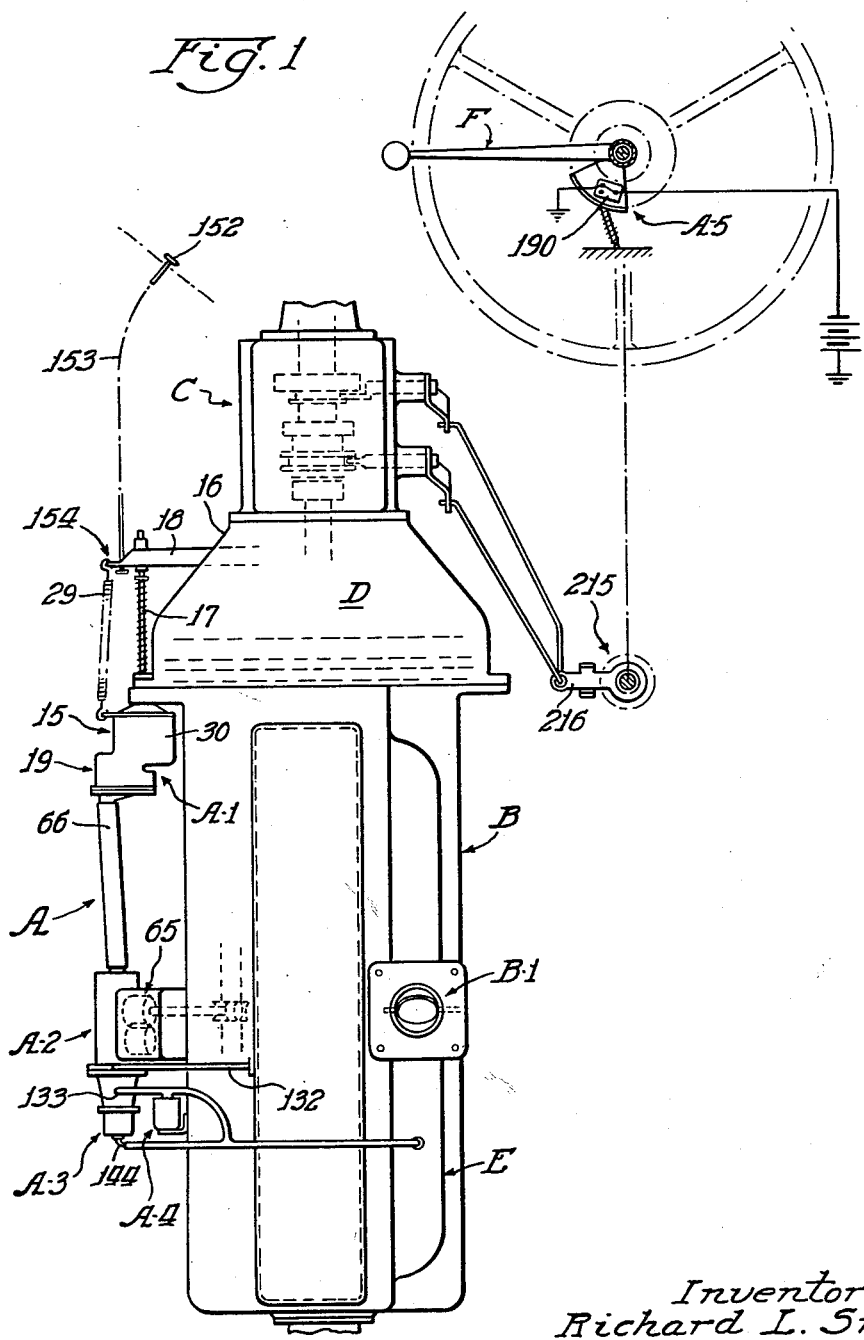

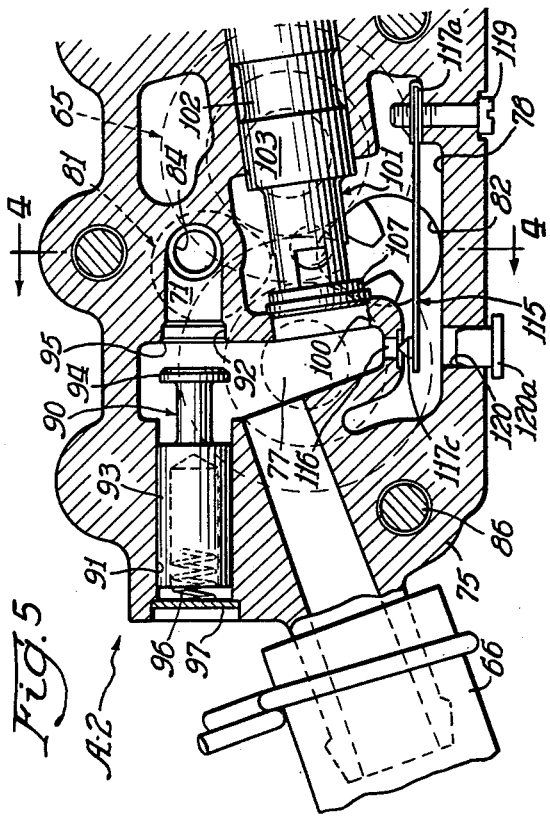

United States Patent Office 3,165,891
Patented Jan. 19, 1965

3,165,891
SERVO-MOTOR FOR AUTOMATIC CLUTCH CONTROL
Richard L. Smirl, La Grange, Miczyslaw J. Waclawek, Olympic Fields, and John W. Adelman and Edward F. La Buda, Chicago, Ill., assignors to Borg-Warner Corporation, Chicago, Ill., a corporation of Illinois
Original application Aug. 2, 1961, Ser. No. 128,916. Divided and this application Dec. 9, 1963, Ser. No. 336,331
4 Claims. (Cl. 60—52)

This invention relates to automatic clutch control mechanisms and more particularly to a servo-mechanism used with a fluid actuating means cooperating with an internal combustion engine for normally automatically engaging the clutch mechanism in response to engine speed and torque, and for automatically disengaging and reengaging the clutch mechanism in response to transmission shift means.

This application is a divisional of parent application, U.S. S.N. 128,916, filed August 2, 1961.

In U.S. Patent No. 2,893,526, by R. L. Smirl, one of the co-inventors of the present invention, a basic disclosure of the intsant type of clutch control system was made; such patent shall be hereinafter referred to as the original disclosure. The instant invention is, therefore, directed to novel improvements over such construction and has as a primary object the provision of an improved clutch control system employing a unique servo-motor which is more effective to automatically promote rapid reengagement after the gear shifting operation has been completed for all driving conditions.

Another object is to provide a more economical and durable clutch control mechanism than prior systems while at the same time providing for more quick response to the needs of the driver. Pursuant to the needs of economy and durability, the mechanism comprises a hydraulic servo-motor energized by fluid pressure from the engine lubricating system and has a primary control valve means responsive both to engine speed and to manifold vacuum for controlling the supply of fluid to the servo-motor; the valve means is uniquely adapted to provide a more compact construction and eliminates the need for extended mechanical linkage between the accelerator pedal and the valve means as required by the original disclosure. Pursuant to the needs of quicker response, the servo-motor is served by a novel three-stage accumulator valve effective to permit rapid initial filling of said servo-motor for initially engaging the clutch and thereafter restricting the rate of filling of said servo-motor for permitting gradual pressure build-up while increasing the engaging pressure of said clutch. This gives the engine time to accelerate slightly above the transmission input speed after each shift to avoid the feel of a torque reversal, and permits reserve pressure to be employed without harshness or abruptness in the engagement. This single accumulator valve obviates the need for several extended hydraulic parts which have attempted to serve the same purpose.

The invention consists of the novel constructions, arrangements and devices to be hereinafter described and claimed for carrying out the above-stated objects and such other objects as will appear from the following description of a preferred form and alternative constructions of the invention illustrated with reference to the accompanying drawings, wherein:

FIG. 1 is a plan view of a typical automobile power unit shown in conjunction with a schematic representation of a steering and gear-shifting mechanism, the novel clutch control mechanism of this invention being illustrated as incorporated therewith;

FIG. 2 is an enlarged elevational view of the clutch actuating means for the clutch control mechanism of FIG. 1;

FIG. 3 is a still further enlarged sectional view of a portion of the clutch actuating means of FIG. 2 and illustrating the disc valve member used with the accumulator valve as part thereof;

FIG. 4 is a sectional view of the primary control valve taken substantially along line 4—4 of FIG. 4 and also illustrating a portion of the engine pumping system cooperating therewith; and, FIG. 5 is en enlarged elevational view, substantially in cross-section, of the primary control valve for the clutch control mechanism.

Illustrated in FIG. 1 is a preferred construction of a clutch control mechanism A embodying the improvements of this invention; the control mechanism is shown as mounted upon a power unit of a typical automobile with which the mechanism cooperates. The power unit comprises an internal combustion engine B controlled by a throttle B-1 and adapted to transmit torque to a conventional synchromesh counter-shaft transmission C through a friction-disc type clutch device D. The transmission C occupies but a fraction of the space normally occupied by a standard automatic hydraulic transmission and is subject to much less maintenanace problems. As far as the driver of the automobile is concerned, the illustrated power unit transmits torque in a seemingly automatic fashion similar to a fully automatic transmission, by utilization of the improved clutch control mechanism A which is responsive to engine operation and to a change in the gear position of the transmission to automatically engage and disengage the clutch D.

The mechanism A, being highly economical, compact and of simple construction, generally comprises the following principal elements: a clutch actuating means A–1 for operating the clutch and actuated by engine lubrication oil pumped thereto, a primary control valve A–2 for regulating the oil pressure administered to the servo-motor and having a vacuum-operated modulating means A–3 connected to the engine manifold E, an electrically operated dump valve means A–4, and a switch means A–5 actuated by the gear-shift lever F. The control valve and clutch actuating means A–1 may each be conveniently mounted on the engine block or clutch housing or the control valve may be mounted on the engine lubrication pump in place of its pump cover plate; these mountings promote the adaptability of the clutch control mechanism to most any automobile construction.

To maintain the clutch D in the engaged condition for normal drive purposes, lubrication oil is pumped by the engine to the servo-motor A–1 and is maintained at an operative pressure level by control valve A–2 so as to apply sufficient clutch engaging force to meet varying driving needs. Upon a change in gear ratio of the transmission, the switch means A–5 automatically actuates the electrical dump valve A–4 to fully communicate the engine manifold E with the vacuum-operated modulating means A–3 for affecting valve A–1 in a manner to dump lubrication oil pressure to an engine sump chamber (not shown) and thereby disengage the clutch D with relief of pressure in the servo-motor A–1. Declutching takes place so rapidly that no difficulty is experienced even during the fastest gear changing. Reengagement of the clutch takes place as the shift lever completes its gear change stroke, whereupon the dump valve is deenergized.

Turning now to FIGS. 2 and 3, the clutch actuating means A–1 for the clutch device D is more specifically shown to comprise a fluid-operated actuator or servo-motor 15 mounted on the housing 16 of the clutch device and has a thrust-rod 17 operatively connected to a clutch actuating lever 18; the fluid intake of the servo-motor is regulated by a fluid accumulator valve assembly 19 integrally affixed to the servo-motor.

Although not fully shown, the clutch device may be constructed in accordance with a clutch device as shown in U.S. Patent 2,253,344, issued 1941 by Nutt and Cook, which is a spring released and hydraulically engaged clutch; the clutch actuating lever 18 extends through an opening in the clutch housing 16 and is adapted to operatively and axially slide a bearing collar journaled to the clutch input shaft which in turn engages a plurality of operating levers which function to bring the friction members of the clutch device together for conjoint rotation. Upon deactivation of the servo-motor, a large tension coil spring 29 and assisted by internal springs of the clutch (not shown) returns the lever 18 to a position in which the clutch device is disengaged; the spring 29 is mounted with one end engaging the outer extremity of lever 18 and the other end engaging a portion of the servo-motor structure.

As shown in FIG. 2, the thrust-rod 17 is arranged with one end 17a engaging a concave seat 21 of a thrust-plug 22, the thrust-plug being threadably and adjustable carried in a retaining sleeve 23 mounted on the outer extremity of lever 18. The thrust-rod 17 is slidably disposed in a sleeve member 24 which in turn is mounted in outer peripheral flanges 16a of the clutch housing 16 and flange 16b of the engine block. The sleeve member 24 acts as a dowel in aligning the clutch housing on the engine block during assemblage. The rod is adapted to articulate therein. The servo-motor 15 is adapted to be threadably mounted on end 24a of the sleeve member and has shoulder 15a abutting the clutch housing 16. The other end 24b of the sleeve member threadably carries a nut means 25 which is adapted to secure the servo-motor and sleeve member to the clutch housing. An annular seal 26 is carried on the thrust-rod for providing an air seal between the sleeve member and the rod; a coiled compression spring 27 is also carried on the thrust-rod and has one end received by an annular groove 28 adjacent the end 17a of the rod and has an opposite end engaging the seal 26, the spring functioning to maintain the seal in proper sealing relationship with the end of the sleeve member.

The construction of the servo-motor A–1 comprises a casing 30 formed with a major internal cylindrical cavity 31 opening to one side of the casing and thereby providing an annular terminal 30a; the major cavity is adapted to receive a cylindrical piston 32 slidably disposed therein and which is attached to the end 17b of the thrust-rod 17 extending thereinto. Terminal 30a of the casing faces and is adjacent the clutch housing 16 and is closed by a casing cover 33 secured thereto by suitable fasteners 34. A central neck portion 33a of the cover is provided with a threaded bore 33b into which the end 24a of the sleeve member is inserted, as above discussed.

A fluid supply opening 35 is formed in the casing at the end of the major cavity 31 opposite the terminal 30a. A cylindrical integral extension 36 of the casing 30 is formed about the supply opening and is adapted to constitute a part of the housing for the accumulator valve assembly 19. The extension 36 is provided with a cylindrical internal minor cavity 38 which is disposed to provide fluid communication between the supply opening 35 and an entrance to the extension 36 defined by an annular terminal 39. The terminal 39 is closed by an extension cover 40 which is secured thereto by suitable fastening means 41 and has a fluid supply passage 42 formed in a lower section thereof. The supply passage, as shown, has a diameter generally commensurate to the diameter of the supply opening 35. A neck portion 40a is formed about the supply passage and is adapted to receive a supply conduit as will be described.

The major and minor cavities, 31 and 38 respectively, have their axes generally parallel but offset one from the other so that the fluid passes into a corner of the cavity 31 from cavity 38. Although this is for purposes of a preferred embodiment it should be indicated that the accumulator valve 19 may be disposed anywhere in the fluid connection between the servo-motor and fluid pressure control. By virtue of an accumulator valve sub-assembly 37, as will now be described, fluid is supplied to the servo-motor so that it may apply a quick initial engaging force with gradually controlled stages of increase in force thereafter.

The sub-assembly 37 comprises a pin shaft 45 having one end journaled in a bearing 46 provided in the extension cover 40 and an opposite end journaled in a bearing 47 provided in the casing 30 adjacent supply opening 35. The pin shaft is generally horizontally disposed and carries a sliding or floating disc valve member 48. The disc valve member has a hub portion 48a provided with a central bore 48b (FIG. 3) which is slidably engaged with the pin shaft. The hub portion has at least one section which extends axially to one side of the disc valve member and has provided on its outer periphery an annular groove 49 (FIG. 3); a slot 50 is formed in the hub portion to communicate the groove 49 and the bore 48b. A spring clip 54, here formed of wire, is mounted on the axially extending section and within the groove 49 and has a nose 51 which is adapted to extend through slot 50 to frictionally engage the pin shaft 45. The spring clip 54 is calibrated to provide a sufficient amount of spring pressure and resulting frictional force to hold the floating disc valve member in any position on the pin shaft to which it is positively moved by the fluid pressure and prevent inadvertent movement.

The disc valve member is adapted to be moved along the pin shaft between two extreme positions by influence of fluid pressure applied to either side thereof. One of the positions is assumed when the valve member has its outer annular margin 48c in engagement with an annular protuberance 52 formed in casing 30 at one end of the minor cavity 38. The other position is assumed when the disc valve member has hub portion 48a engaging a central shoulder 53 formed about the bearing 46 on the extension cover 40. It should be noted that in either of these extreme positions, there is defined a chamber between the disc valve member and the most adjacent portion of the accumulator housing in which fluid pressure may act on opposite sides of the disc valve at all times.

The valve member, as shown, has a circular periphery which is dimensioned to be spaced slightly radially inwardly from the walls defining minor cavity 38. Therefore, in the first position as above defined, the disc valve member closes off fluid flow around the disc valve member by virtue of its complete annular contact with the protuberance 52; in the second position, the disc valve member permits fluid flow between its periphery and the housing.

To enable the disc valve member to have an accumulating function, it is provided with one or more small ports 55 formed on a portion thereof radially offset from its axis. It can be readily appreciated from the drawings and by virtue of the port 55, that in filling the servo-motor major cavity 31, the floating disc valve member 48 permits fluid to rush in quickly at first until the disc valve member seats against the annular protuberance 52. Further application of fluid pressure to the accumulator valve assembly causes further buildup of pressure in the servo-motor cavity 31 to be gradual as determined by the size of the port 55. It is important that the volume of minor cavity 38 and the diametrical dimension of port 55 be constructed to give smooth clutch engagement under all operating conditions. For purposes of the preferred embodiment, the volume of the minor cavity 38 has been calibrated to generally equal the displacement volume of the servo-motor A–1 providing for initial filling of the servo-motor to take place swiftly before the floating disc valve member seats against the annular protuberance 52.

Clutch engagement will thereby be much smoother since further application of pressure is modulated by operation of the port 55.

To enable the accumulator valve 19 to function properly in spite of varying extremes of temperature of the fluid used therein, fluid communication between cavity 31 and 38 is assisted by an opening 56 provided in the casing 30. Opening 56 may be located partially or completely radially outwardly of the outer periphery of accumulator valve member 48. This opening is operably controlled by a temperature responsive valve means 57 comprising a bi-metal strip 58 arranged within cavity 31 and secured at one end to a boss 59 formed at the base of the cavity. The other end of the bi-metal strip carries a restricting element 60 which is adapted to close off opening 56 when brought thereagainst. Thus, when the oil lubricating temperature is low, its viscosity is correspondingly very high and therefore the temperature responsive valve means 57 will remain in position to keep opening 56 unrestricted. When the oil becomes hot, after the engine has been operating for some time, the accumulator valve means moves into position for closing off opening 56; the fluid may then pass only through opening 56 if open.

The opening 56, as controlled by the temperature responsive valve means 57, cooperates with the accumulator valve to provide a three-stage admission of fluid to the servo-motor. The first being the swift injection of fluid therein as the disc valve moves along the pin shaft. The second being a reduced flow as fluid passes only through port 55 and opening 56; the onflow of oil tends to spring the strip 58 back since it has a light spring effect. As the pressure in the servo-motor tends to equal the incoming pressure, the bi-metal strip 58 will close off opening 56 and flow is further reduced so as to pass only through port 55.

To complete the clutch actuating means, reference is now made to FIG. 4, in which is shown one portion of a fluid supply and pumping means 65, which is adapted to deliver lubricating oil through the primary control valve means A–2 and through conduit 66 (FIG. 1) to the passage 42 of the accumulator valve assembly 19. More particularly, the fluid supply and pumping means 65 comprises a pump 73 of any suitable construction and arranged for drawing fluid such as lubricating oil from an oil reservoir or sump (not shown) by means of an inlet passage 68 leading to chamber 67 of the pump, and for delivering pressurized oil to an outlet chamber 69 in the pump. The outlet chamber is connected at one side to an engine lubrication conduit 70 and at the other side to an inlet chamber 71 in the primary control valve A–2. Conduit 70 and inlet passage 68 may be suitably formed by borings within the engine block adapted for alignment with the inlet and outlet of the pump 73; the pump may be driven by the crankshaft of the engine B in any suitable manner (not shown).

It should be indicated that the only passage subject to the time delay associated with the flow of viscous fluid in the control system is the conduit 66 which is actually made quite short (FIG. 1) by locating the primary control valve means A–2 close to or integral with the servo-motor A–1, all of the other passages between control members handle only a small displacement of fluid which results in almost instantaneous response.

The primary control valve means A–2 is adapted to regulate the pressure of the oil flowing between the pump 65 and the servo-motor A–1, the oil pressure being used to hydraulically engage and disengage the clutch D in response to manual selection and, furthermore, to vary the clutch engaging force in sympathy with the varying conditions of the engine.

The control valve means comprises a housing 75 formed of cast material, such as aluminum, and has provided therein three major and irregularly shaped chambers; inlet chamber 71, control or sensing chamber 77, and exhaust chamber 78. One side 79 (FIG. 4) of the housing is formed substantially flat and is adapted to be mounted facing the pump; each of the indicated chambers are formed in the housing so that they may open outwardly upon the flat side 79 and have an outcrop configuration within the plane of the flat side which is generally commensurate to the greatest dimensions of such chambers. This facilitates repair and easy access to the chambers. As shown in FIGS. 5 and 7, the housing is highly compact, having a thickness in the direction toward the engine which is equal to or less than one-half the length or height of the housing.

A flat housing plate 80, having a generally rectangular outer periphery similar in shape to the periphery of the flat side 79 of the housing, is adapted to be sandwiched between the flat side of the housing and the pump 73 during assemblage, as shown in FIG. 5. A pair of apertures 81 and 82 are formed in plate 80; aperture 81 is adapted to communicate the upper chamber 69 of the pump with the inlet chamber 71 of the housing 75. Aperture 81 has a stepped configuration including a pear-shaped large bore 83 adjacent chamber 69 and a smaller bore 84 adjacent chamber 71. As will be described subsequently, the smaller bore 84 functions as a restriction to control the supply of fluid to the clutch engaging system and at closed throttle position, clutch engagement is made somewhat softer. The bore 84 also functions to provide further increases in engine lubrication pressure with higher spreads in spite of the attainment of maximum pressure in the clutch system; this insures that the engine lub. pressure will always be greater than the pressure in the clutch system. Aperture 82 is generally pear-shaped and is adapted to communicate chamber 67 of the pump and the exhaust chamber 78 of the housing. Aperture 82 is sufficiently large so as not to affect the flow of the system.

A plurality of aligned openings 85 are provided in and through the housing 75, plate 80, and pump 73; each opening receives the shank of a mounting cap screw 86. The inner ends of each of the cap screws is adapted to be threadably received in a threaded bore 87 formed within the block of the engine.

To insure that the engine B will be supplied with sufficient lubricating oil before any oil is diverted to the servo-motor A–1, a pre-load or poppet valve 90 is slidably disposed within a cylindrical cavity 91 formed in the housing and communicating the exterior thereof with the control chamber 77. A regulator opening 92 is formed in the housing communicating the inlet chamber 71 and the control chamber; the opening 92 is generally aligned with the cavity 91. The pre-load valve 90 has a hollow cylindrical section 93 which slidably engages the walls of the cavity 91 and carries a valve head 94 extending axially therefrom and adapted to close off the opening 92 when seated against an annular valve seat 95 about the opening. The pre-load valve is normally urged into the closed position of opening 92 by a coiled compression spring 96 contained within the hollow interior of section 93 and acts between the preload valve and a cap 97 covering the exterior of cavity 91. The spring is adapted to provide a light load and allow the pre-load valve to open when a predetermined relatively low pressure has been achieved in the inlet chamber 71. For purposes of the preferred embodiment, it is preferable to calibrate spring 96 to prevent oil from flowing into the control chamber 77 until generally 10 p.s.i. of pressure has been developed.

For effecting engagement of the clutch device and for regulating the pressure build-up in the control chamber 77, the housing 75 has formed therein a by-pass or discharge port 100 which has a generally large diameter so that the dimension of the port will not provide a restriction to flow through the system when fully open. The by-pass port communicates between control chamber 77 and exhaust chamber 78. A control valve assembly 101 is associated with the port 100 and comprises a valve member or element 102 having a pair of spaced lands 103 and 104 which are slidably disposed within a cylindrical cavity 105 formed in the housing and communicating the exterior of the housing with the exhaust chamber 78. One end of the valve member 102 has formed thereon a neck portion 106 which carries a valve head 107 adapted to seat against an annular valve seat 108 formed about the port 100; the port is adapted to be closed off when the valve member is in the position as shown in FIG. 7. The opposite end of the valve member has an extension 109, engaging diaphragm 110 which in turn is spring loaded to urge the valve member to the closed port position. The valve member is arranged so that the inner face 111 of the valve head is subjected to the pressure of the control chamber 77, wherefor the control valve assembly is caused to act as a pressure relief valve for the pump to prevent the build-up of excessive pressure in the engine lubrication system and in the clutch control system.

To simplify the establishment of clutch engaging pressure differing from that due solely to engine speed for certain of the high speed driving ratios and to eliminate requirements for rotating weights or valves, a by-pass speed responsive pressure control orifice construction is provided in the valve member 102 which is adapted to return the discharge of the engine driven pump back to the pump in a predetermined flow manner. To this end, a thin plate orifice 147 is centrally provided in the valve head 107 and communicates with diametrically extending bore 148 opening into exhaust chamber 78. The bore is made sufficiently large so that it will offer relatively no restriction to flow compared to the by-pass orifice, the orifice will modulate the pressure increase in the control chamber in a manner such that the increase in engagement pressure transmitted to the servo-motor will vary approximately in proportion to the square of the engine speed so that the effect is almost identical in clutch engagement with an arrangement of a centrifugal clutch for controlling clutch engagement pressure.

At engine idle, when the transmission is in gear, it is very desirable to have the clutch device slightly dragging in order to utilize the engine as a braking means during hill coasting and to take up the phenomenon of drive line back-lash when fully engaging the clutch and thereby avoid initial thump. To initiate such slight drag on the clutch, the pressure in the control chamber must be maintained slightly higher than necessary to overcome the force of the retractor spring and the springs within the clutch device itself. This requires some means for augmenting the pressure in the control chamber, assuming that the orifice size is predetermined to give a reasonable full throttle stall speed and the retractor spring is calibrated to give a sufficient and quick release upon dissipation of pressure in the control chamber. To meet such requirement, the by-pass orifice is adapted to be closed by a pre-loaded valve 149 in the form of a ball and is urged toward closing position by a coil spring 150 acting between one end of the bore 151 provided in the valve member 102 and one side of the ball pre-load valve. Such spring acts upon the pre-load ball valve to set a low limit on the pressure within the control chamber when the valve member closes off the release port 100.

It is desirable, however, to limit the initial idling engagement to about 6 ft.-lb. of torque (or 6–8 p.s.i.) to avoid appreciable creep after the vehicle is stopped in low gear and to avoid engine "throb" when standing in gear.

Thermostatically controlled means 115 is provided within the housing 75 for controlling a limited flow of fluid from the control chamber 77 to the exhaust chamber 78 and thereby to the inlet side of the pump. Herein such means comprises an opening 116 communicating chambers 77 and 78 and a thermostatic valve member 117 which is mounted in chamber 78 and adapted to close off opening 116. Member 117 comprises a bi-metallic strip having one end 117a secured to the inner wall of chamber 78 by a suitable fastener 119 and an opposite end 117b which carries a conically shaped plug 117c arranged to restrict the opening upon movement or flexing of strip 117 in response to changes in temperature of the oil. The construction and arrangement of the thermostatic valve means 115 is such that the fluid pressure drop across the by-pass port will be the same regardless of changes in the viscosity of the lubricating oil by changes in its temperature for any given pressure in the chamber 77. A change in temperature of the lubricating oil will cause the bi-metallic strip to change its shape and thereby to move the plug 119 to or from the opening 116. Thus, the pressure drop across the by-pass port is substantially unaffected by changes in oil temperature so that there will be no alteration in the control characteristics between the period of starting with a cold engine and operation after the engine has warmed up.

A drain opening 120 is provided in housing 75 and is normally closed by stopper 120a; such drain opening facilitates removing all fluid from the chamber 78 as desired.

The vacuum operated modulation means A-3 (not shown in FIG. 5) is adapted to be operated both automatically and manually for regulating the movement of the valve member 102. This matter is more fully explained in the parent application S.N. 128,916. The modulation of the pressure supplied to the servomotor, although important to the initial actuation of the servomotor, is not critical to the invention herein as far as the structure is concerned.

*Operation*

The operation of the clutch control mechanism may be seen by following through a typical example. Assuming that the engine B is started and warmed up to normal operating temperature and idling speed, the engine driven pump and supply means 65 will deliver fluid from passage 68, to pump chamber 69, and then into the inlet chamber 71 of the primary clutch control housing 75. Further, assume that the throttle of the engine is relatively closed. When the oil pressure in passage 70, chamber 69, and chamber 71 of the clutch control housing have reached the pre-determined required operating pressure for the other controls of the vehicle and is sufficient to lubricate the engine, the pre-load valve 90 will open and full delivery of the pump will be available to produce pressure against the piston 32 of the servo-motor 15.

If it is further considered that the gear shift lever is in the neutral position, the available pressure will be fully dumped so that the servo-motor A-1 is not actuated and thereby the clutch is maintained disengaged.

In the initial stages of moving into first gear position, and with the control valve closed, available pressure will be delivered to the accumulator valve from chamber 77 through conduit 65 to the inlet passage 42 of the accumulator valve assembly 19. The initial pressure is admitted to the servo-motor chamber 31 in timed sequence by virtue of the accumulator valve assembly so that the clutch will be engaged quickly and in a smooth and gradual manner to avoid abrupt bumps which are experienced in past constructions. To achieve these advantages, the accumulator valve, containing a charge of fluid, functions such that the floating disc valve 48 is moved swiftly toward the left in FIG. 3 by application of increased fluid pressure to conduit 66. The charge of fluid enters chamber 31 rapidly to move piston 32 sufficiently for applying an engaging force to the clutch device. A small amount of fluid is permitted to flow around the periphery of the floating disc valve and between casing wall 38 during this sweeping movement of the floating disc valve, but such amount of fluid is relatively negligible.

To fully engage the clutch, further build-up in fluid pressure is controlled by port 55 in the disc valve and opening 56 in the casing 30 which permits only a gradual flow and a gradual build-up of pressure in the clutch chamber 31. The gradual increase is essentially in two stages, as provided in the preferred embodiment. The temperature responsive strip 58 is sprung back by in-flow of oil to the servo-motor until pressures in cavities 31 and 38 are equalized, at which time oil flow is restricted solely through port 55; assuming the oil to be cold. It is significant that the floating disc valve is located in its first position, at the extreme right position of the assembly 19 in FIG. 3, since prior disengagement of the clutch device enables the retraction spring 29 to move lever 18 to the right, thereby bringing piston 32 to its extreme right position and forcing fluid backwardly through the accumulator valve assembly. In doing so, the backwash of the fluid is sufficient to force the disc valve member to its first position. The disc valve will normally be found in one or the other of said extreme positions since spring clip 54 tends to hold it stationary on the pin shaft 45 until a positive fluid force acts thereagainst.

While we have described my invention in connection with a certain specific construction and arrangement, it is to be understood that this is by way of illustration and not by way of limitation and the scope of our invention is defined solely by the appended claims which should be construed as broadly as the prior art will permit.

We claim:

1. In a drive engagement control apparatus having a source of fluid pressure, a fluid accumulating means for controlling fluid pressure supplied to said apparatus comprising: a housing having walls defining a generally cylindrical chamber, a pin shaft disposed in said chamber and mounted between opposite walls thereof, an outlet from said chamber and an inlet to said chamber, an annular protuberance formed about said outlet and a boss disposed within said cavity and formed adjacent said inlet, a thin disc valve mounted on said pin shaft for sliding movement thereon and having the plane of said valve disposed generally radially of said chamber, said disc valve having a generally circular periphery spaced from the walls of said chamber, said disc valve being moved by fluid pressure between a first position wherein said valve annularly engages said protuberance to close off said outlet and a second position in which said valve engages said boss without obstructing said inlet, said disc valve having at least one opening provided therein which is much smaller than said outlet, and brake means mounted on said disc valve adapted to frictionally engage said pin shaft for providing a braking force which holds said disc valve in the position to which it is moved by a predetermined fluid force.

2. A drive engagement control apparatus, as in claim 1, in which said disc valve has an axially extending hub portion with a bore therethrough for receiving said pin shaft and has an annular groove on its outer surface, said hub portion further being characterized by having a radially extending slot communicating said groove and said bore, and said brake means comprising a spring clip having at least one portion thereof seated in said groove diametrically opposite said slot and having a nose portion adapted to extend through said slot for frictionally engaging the pin shaft and thereby providing a braking force sufficient to hold the disc valve stationary on the pin shaft until acted upon by a predetermined pressure force.

3. A drive engagement control apparatus, as in claim 1, in which said accumulating means further comprises a thermostatic responsive valve means adapted to maintain the pressure build-up of fluid within the outlet of said accumulating means and while the disc valve is in said first position in proportion to the volumetric increase of pressure supplied thereto, thermostatic responsive valve means isolating said pressure build-up from any effects of changes in viscosity of said fluid.

4. Mechanism for controlling engagement of a friction engaging device arranged to provide for transmission of torque between a drive member and a driven member, comprising a pump driven by said drive member, a casing having a control chamber for receiving the output from said pump, a primary valve control means for regulating pressure in said chamber and having by-pass means including a fixed diameter orifice for the output of said pump to provide a graduated increase in pressure in said chamber in accordance with an increase in speed of said pump and said driven member, manually controlled means for applying an opening force on said valve control means to relieve the pressure in said chamber, and means for applying an engaging force to the engaging device in accordance with the pressure in said chamber, said means providing an engaging force being particularly characterized by a fluid operated servo-motor having a fluid accumulating means for controlling the fluid pressure supply to the servo-motor whereby a graduated build-up of pressure in said servo-motor is achieved, said servo-motor comprising a piston and casing having a cylindrical cavity therein for slidably receiving said piston, said casing having a cylindrical extension at one end thereof provided with a cylindrical chamber therein, said casing having supply opening communicating said cavity and chamber and being adapted not to restrict fluid flow therebetween and having a relief opening, thermostator valve means in said cavity having a bi-metallic strip adapted to close off said relief opening in response to a predetermined temperature, a pin shaft disposed in said extension chamber and mounted between opposite walls thereof, an inlet to said extension chamber, an annular protuberance formed about said supply opening and within said extension chamber, a boss formed within said extension chamber and disposed adjacent said inlet, a thin disc valve mounted on said pin shaft for sliding movement thereon and having the plane of said valve disposed generally radially of said extension chamber, said disc valve having a generally circular periphery spaced from the walls of said extension chamber, said disc valve being moved by fluid pressure between a first position wherein said valve sealingly engages said protuberance to close off said supply opening and a second position in which said valve engages said boss without obstructing said inlet, said disc valve having at least one opening provided therein which is much smaller than said outlet, said accumulating means providing a stepped coupling engagement wherein a specific volume of fluid is admitted to the engaging force means for providing an initial soft coupling engagement and thereafter a reduced flow of fluid is permitted to enter said servo-motor in response to pressure of said source for providing a gradually increasing coupling force, said reduced flow being stepped with a first flow through both said disc valve opening and relief opening and then solely through said disc valve opening as the pressures on opposite sides of the relief opening tend to equalize.

References Cited in the file of this patent
UNITED STATES PATENTS

| | | |
|---|---|---|
| 577,489 | Mills | Feb. 23, 1897 |
| 2,755,774 | Floyd | July 24, 1956 |
| 2,870,744 | Hallerstrom | Jan. 27, 1959 |